Patented Aug. 1, 1939

2,168,078

UNITED STATES PATENT OFFICE 2,168,078

PROCESS FOR REMOVING ACID COMPONENTS FROM HYDROCARBON DISTILLATES

David Louis Yabroff, Berkeley, Calif., assignor to Shell Development Company, San Francisco, Calif., a corporation of Delaware No Drawing. Application February 7, 1939, Serial No. 255,101

8 Claims. (Cl. 196—32)

This invention is a continuation-in-part of my co-pending application Serial No. 102,893, filed September 28, 1936, which has issued as Patent No. 2,152,166, March 28, 1939, and deals with the removal of weakly acid reacting organic substances from solutions in certain water-insoluble organic liquids by extraction with aqueous solutions of caustic alkali containing a solubility promoter for these substances, and more particularly deals with the removal of mercaptans from hydrocarbon distillates.

It is frequently necessary to eliminate small quantities of organic relatively weak acid reacting components such as mercaptons, phenols, thio-phenols, alkyl phenols, fatty acids, etc., from their solutions in neutral or weakly basic reacting organic liquids which are substantially immiscible with water such as the liquid hydrocarbons derived from petroleum, benzene, toluene, xylene, substituted normally liquid hydrocarbons which are substantially insoluble in water, for instance, chlorinated hydrocarbons, of which chlorethane, ethylene dichloride, trichlorethylene, carbon tetrachloride, chlorpropane, chlorbutylene, chlorbenzene, brombenzene, are examples; or nitrogen containing hydrocarbons such as amyl or higher amines, aniline, water-insoluble pyridine derivatives, petroleum bases, etc.

In order that the water-insoluble organic liquids may be treated by my process, they must be substantially inert and resistant to chemical reaction with strong aqueous solutions of caustic alkali when contacted therewith for short periods of time, e. g., about 10 minutes or less at normal room temperatures.

My invention comprises extracting organic acids which are difficult to extract, such as the weak acids having dissociation constants lower than those of fatty acids, e. g., mercaptans, phenols, etc., contained in water-insoluble organic liquids which are substantially inert toward strong aqueous caustic alkali solutions at normal room temperatures, with an aqueous solution of caustic alkali in which is dissolved a substantial amount of a solubility promoter for weak organic acids, under conditions to absorb at least a major portion of the weak organic acids in the aqueous solution, and to form two layers and separating the layers.

In the application Serial No. 102,893, filed September 28, 1936, I have disclosed that certain polar substances which are at least partly miscible with aqueous solutions of strong caustic alkali, promote the solvent power for weak organic acids of aqueous caustic alkali solutions in which they are dissolved. I have shown that among other compounds, certain glycols including amino dihydroxy butane are highly effective in the matter of promoting the solubility of weak organic acids such as mercaptans, phenols, etc., in aqueous caustic alkali solutions. I have discovered that of the amino glycols those having 3 to 5 carbon atoms are particularly useful for my purpose. Members of this group are the amino dihydroxy propanes, amino dihydroxy butanes, amino dihydroxy pentanes, methyl amino dihydroxy propanes, ethyl amino dihydroxy propanes, dimethyl amino dihydroxy propanes, and methyl amino dihydroxy butanes. These amino diols are miscible with strong aqueous caustic alkali solutions, and at the same time are little soluble in water-insoluble organic liquids, and in particular in liquid hydrocarbons. Amino diols of 6 and more carbon atoms are unsuited because they are insufficiently soluble in strong aqueous caustic alkali solutions and excessively soluble in water-insoluble organic liquids.

For example, when treating a solution of mercaptans in isooctane with 10% by volume of a 2½ normal caustic soda solution in which is dissolved 50% of a diol, the following K values were obtained, K being the partition coefficient for the mercaptan between the aqueous and the oil layers, $$K = \frac{\text{concentration of mercaptans in aqueous phase}}{\text{concentration of mercaptans in oil phase}}$$

Table

| Mercaptans | Solubility promoter | | |
| --- | --- | --- | --- |
| | Amino propylene glycol | Amino butylene glycol | None |
| $C_3$ | 45 | 106 | 39 |
| $C_4$ | 11 | 32 | 7.7 |
| $C_6$ | 2.8 | 10 | 1.2 |

Aqueous solutions of various caustic alkalis may be used. The alkali metal hydroxides are most useful and effective, although ammonia, alkaline earth hydroxides, quaternary ammonium bases, alkali metal carbonates, etc., may also be suitable.

The concentration of the aqueous caustic alkali may vary within wide limits. In general, we prefer to use caustic alkali solutions which are above about 2 normal and preferably between 4 to 10 normal, calculated on the total solution, although higher and lower concentrations may be used.

Concentration of the amino diols in the aqueous solution should be kept between the limits of 15 to 85% and preferably between 25 to 75%, the solubility promoting effect at concentrations below about 15% being too small for practical purposes, and at concentrations above 85% losses of solubility promoter to the non-aqueous phase become excessive, so as to nullify economic advantages gained by the presence of the solubility promoters in the aqueous caustic alkali solution. To minimize losses of the diols from this source, and more particularly to make possible easy regeneration by steam stripping, the aqueous solution should contain at least 15% water and preferably from 15 to 50% water. When treating hydrocarbon solutions of weak organic acids the former reason, however, is relatively unimportant since the amino diols are substantially insoluble in hydrocarbons even if the amount of water is substantially less than 15%.

The temperature of the extraction is preferably kept between 0° and 60° C., the extraction efficiency decreasing with increases in the temperature; and at temperatures below about 0° C. difficulties are frequently encountered due to precipitation of a portion of the solubility promoter and/or excessive viscosity of the aqueous caustic alkali containing the solubility promoter.

The extraction of the organic acids from their solutions in the organic liquids described before may be carried out by simply mixing the solution with a predetermined amount of the aqueous caustic alkali solution in which is dissolved a substantial amount of the amino diol, and then separating the liquids. The resulting aqueous solution contains most of the amino diols and the major portion of the organic acids, while the organic liquid stripped from the acids contains a trace of the amino diol. By washing the stripped organic liquid with water, the amino diol is re-extracted by the latter. The aqueous solution so obtained may then be added to the caustic alkali solution containing the bulk of the amino diol, and excess water may be separated from the resulting solution by distillation.

More thorough extraction may be had, however, in a multi-stage countercurrent extraction system or in a packed tower.

The amount of aqueous caustic alkali solution required in the extraction is normally above about 5% by volume and for economical reasons seldom exceeds about 100% by volume. Normally from about 10 to 50% by volume is used depending upon the required thoroughness of removing the weak organic acids.

Spent aqueous caustic alkali solution containing the amino diol and weak organic acids may be regenerated by distillation, steaming and/or oxidation, according to well-known principles.

I claim as my invention:

1. In the process of separating organic acid reacting substances contained in a water-insoluble neutral or basic organic liquid, the steps comprising treating said liquid with an aqueous solution of a strong base containing a substantial amount of a dissolved aliphatic amino glycol having from 3 to 5 carbon atoms, under conditions to absorb at least a portion of said acid reacting substances in said aqueous solution and to form two liquid layers, one comprising the aqueous solution containing absorbed acid reacting substances, and the other consisting essentially of the treated organic liquid and separating the layers.

2. The process of claim 1 in which the aqueous base solution contains between 15 and 85% of the amino glycol.

3. The process of claim 1 in which the aqueous base solution is from 2 to 10 normal.

4. The process of claim 1 in which the organic liquid is extracted with 5 to 100 volume percent of aqueous base solution containing the amino glycol.

5. The process of claim 1 in which the base is an alkali metal hydroxide.

6. The process of claim 1 in which the amino glycol is amino propylene glycol.

7. The process of claim 1 in which the amino glycol is amino butylene glycol.

8. In the process of separating mercaptans from hydrocarbon distillates containing same by extraction with an aqueous solution of a strong base, the improvement comprising extracting said distillate with at least 5 volume percent of a 2 to 10 normal aqueous alkali metal hydroxide solution in which is dissolved between 15 and 85% of an aliphatic amino glycol having from 3 to 5 carbon atoms under conditions to absorb at least a major portion of the mercaptans in the aqueous solution and to form two liquid layers, one comprising the aqueous alkali metal hydroxide solution containing substantially all of the amino glycol and the major portion of the mercaptans, and the other consisting essentially of treated hydrocarbon distillate, and separating the layers.

DAVID LOUIS YABROFF.